United States Patent [19]

Pennington, Jr. et al.

[11] Patent Number: 4,984,944
[45] Date of Patent: Jan. 15, 1991

[54] DRILL BIT BLADE FOR MASONRY AND ROCK DRILL

[75] Inventors: Donald C. Pennington, Jr.; John D. Knox, both of Louisville, Ky.

[73] Assignee: Vermont American Corporation, Louisville, Ky.

[21] Appl. No.: 177,187

[22] Filed: Apr. 4, 1988

Related U.S. Application Data

[63] Continuation-in-part of Ser. No. 2,428, Sep. 9, 1987, abandoned.

[51] Int. Cl.$^5$ .............................................. B23B 51/00
[52] U.S. Cl. .................................... 408/223; 175/410; 408/227
[58] Field of Search ................ 175/410; 408/144, 186, 408/189, 199, 200, 223, 224, 227, 228, 713

[56] References Cited

U.S. PATENT DOCUMENTS

| 1,069,930 | 8/1913 | Down | 408/223 |
| 2,598,459 | 5/1952 | Steffes | 175/410 |
| 2,673,714 | 3/1954 | Hargrave | 175/410 |
| 3,460,409 | 8/1969 | Stokey | 408/199 |
| 4,047,826 | 9/1977 | Bennett | 408/199 |
| 4,356,873 | 11/1982 | Dziak | 408/705 |

FOREIGN PATENT DOCUMENTS

| 714611 | 11/1931 | France | 408/224 |
| 39290 | 3/1979 | Japan | 408/224 |
| 106709 | 8/1980 | Japan | 408/230 |
| 15907 | 2/1981 | Japan | 408/233 |

Primary Examiner—Daniel W. Howell
Attorney, Agent, or Firm—Jon C. Winger

[57] ABSTRACT

A drill bit blade for masonry and rock drills incudes first and second lateral side surfaces, first and second flank side surfaces, and converging first and second tip face surfaces. A first lateral cutting edge is defined by the intersection of the first tip face surface with the first lateral side surface, and a first lateral trailing edge is defined by the intersection of the first tip face surface with the second lateral side surface. A first lateral cutting edge is defined by the intersection of the first tip face surface with the second lateral side surface, and a second lateral trailing edge is defined by the intersection of the second tip face surface with the first lateral side surface. A chisel edge is defined at the converging intersection of the first and second tip face surfaces. A first notch is formed in the first lateral trailing edge and second lateral cutting edge at one end of the chisel edge, and a second notch is formed in the second lateral trailing edge and first lateral cutting edge at the other end of the chisel edge. In addition, notches are also formed in the first and second lateral cutting edges to divide the lateral cutting edges into cutting edge segments.

18 Claims, 9 Drawing Sheets

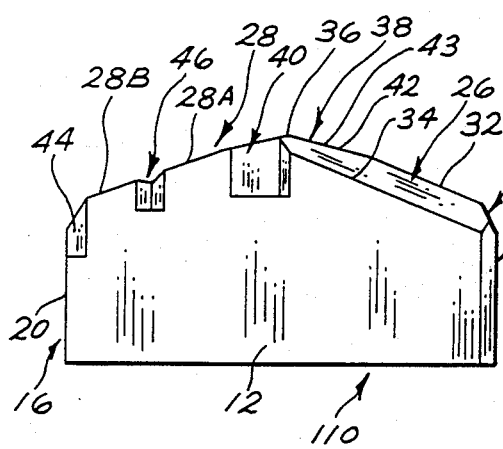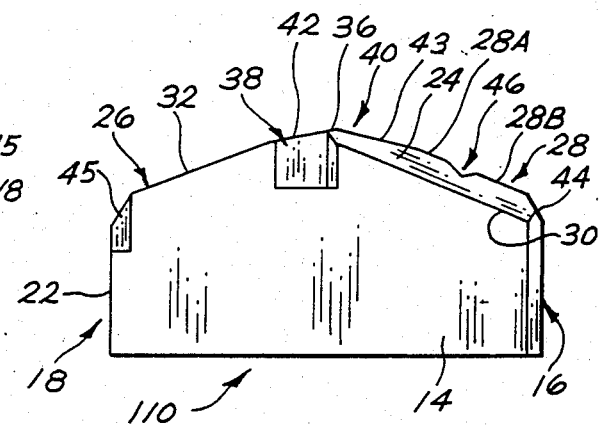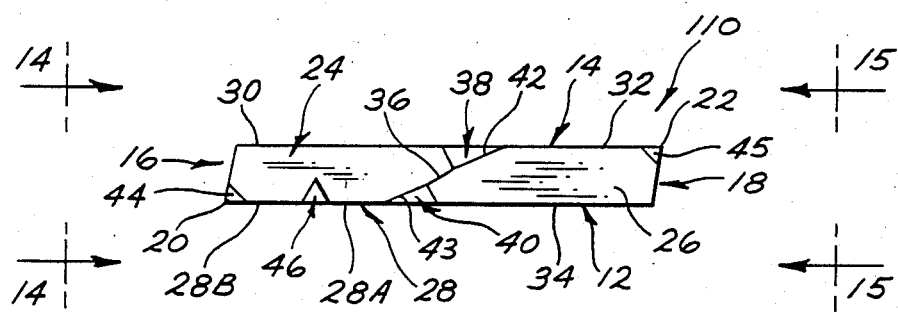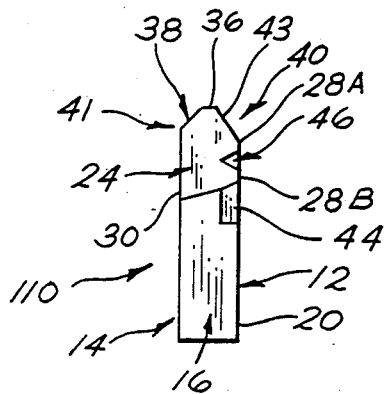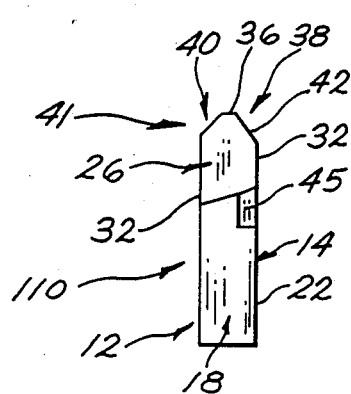

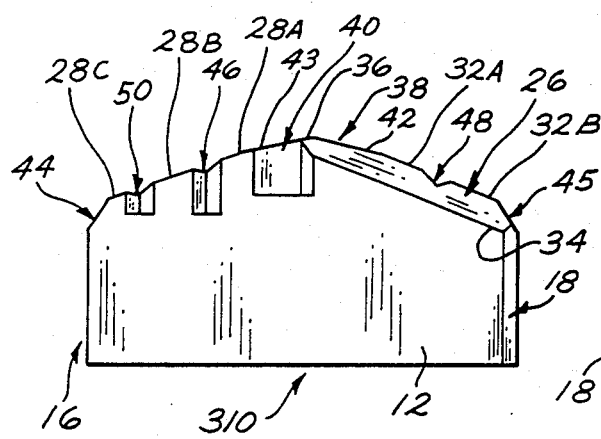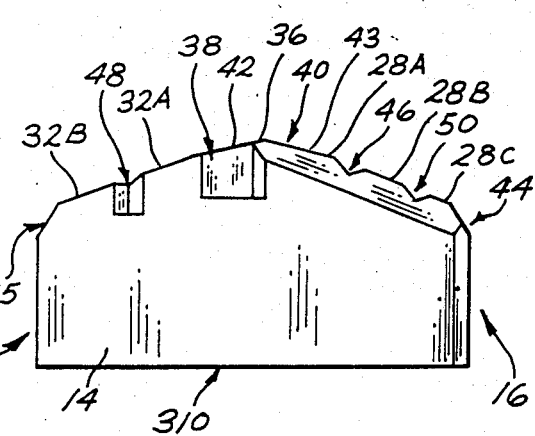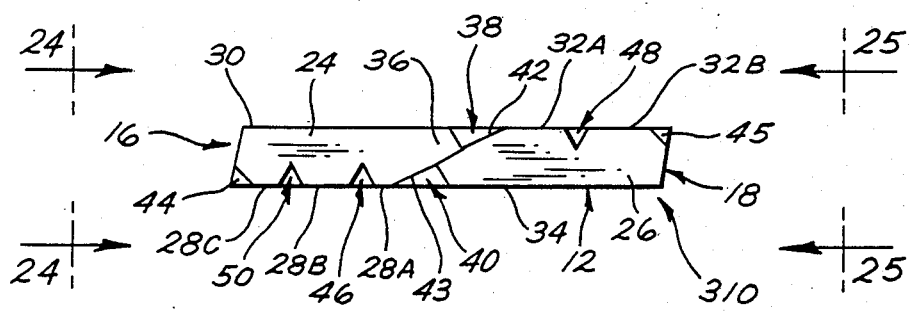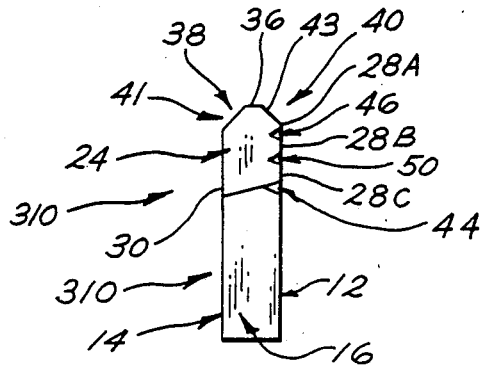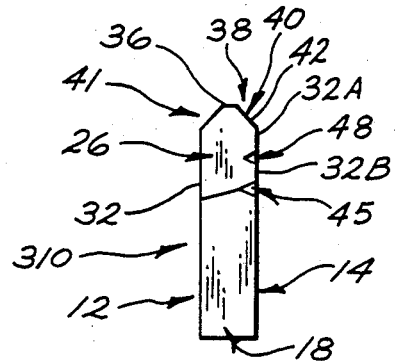

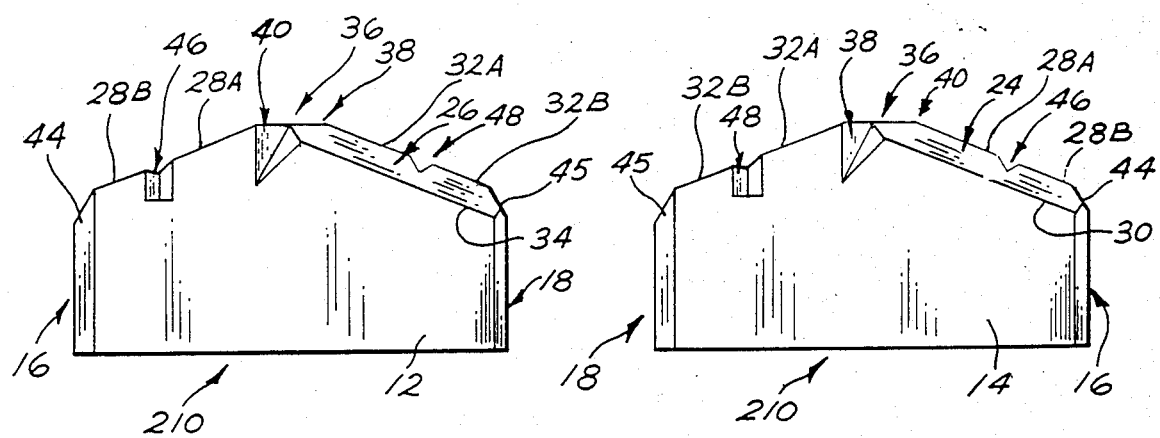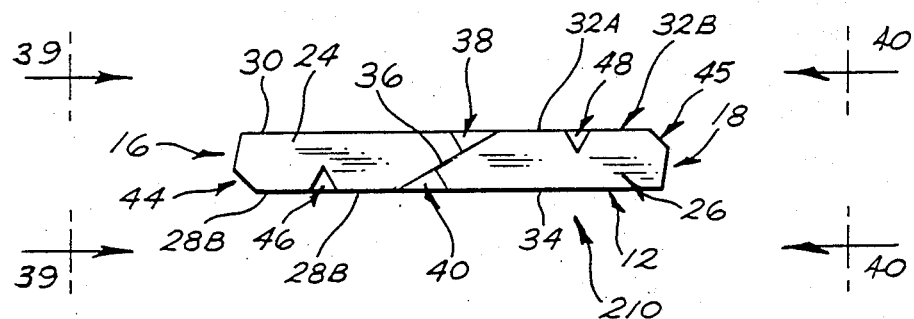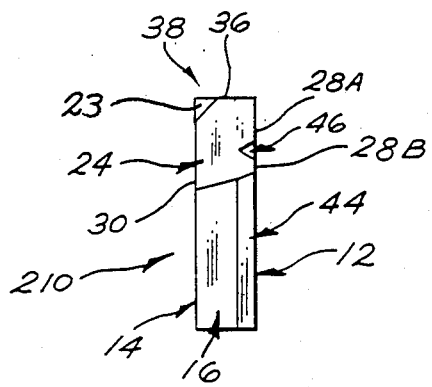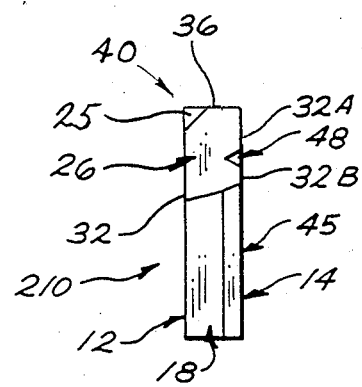

DRILL BIT BLADE FOR MASONRY AND ROCK DRILL

CROSS-REFERENCE TO RELATED APPLICATION

This application is a Continuation-in-Part of U.S. Pat. application Ser. No. 7-012,428, filed Feb. 9, 1987, now abandoned.

BACKGROUND OF THE INVENTION

The present invention relates to drill bits and more particularly to drill bit blades for drilling into masonry, rock and like hard brittle material.

Drill bit blades for drilling into rock, concrete, masonry material and similar brittle material are per se known. These drill bit blades are typically fabricated of tungsten carbide.

Typically also, drill bit blades for drilling into masonry, rock, concrete, and like hard brittle material have planar lateral side surfaces, flank end surfaces oriented at an angle to the lateral side surfaces defining flank cutting edges at the intersections of the flank end surfaces and the lateral side surfaces, and tip face surfaces converging from the flank end surfaces to the center of the drill bit blade defining a chisel edge at the intersection of the two tip face surfaces. The tip face surfaces are also oriented at an angle to the lateral side surfaces defining lateral cutting edges at the intersections of the tip face surfaces and the lateral side surfaces. These heretofore known drill bit blades thus have a long chisel edge and present a flat apex in profile or side view.

A problem with such typical drill bit blades is that they have a tendency to "walk" that is they are difficult to hold at the center of a hole to be drilled when beginning to drill a hole because of the long chisel edge and flat or blunt blade profile. In addition, also due to the long chisel edge and blunt profile, a large feed thrust force and large torque force are required to force the drill bit blade into the material to be drilled.

SUMMARY OF THE INVENTION

The present invention recognizes the drawbacks of the heretofore known drill bit blades for drilling holes into masonry, rock, cement, and like hard brittle materials, and provides a drill bit blade of the class described which provides for faster penetration into the material, increased drill bit blade life, less thrust force required to drill, and less torque force on the drill bit blade when drilling, and reduced walking of the tip of the blade bit for better centering of the drill bit blade.

More particularly, the present invention provides in one advantageous embodiment, a drill bit blade for a masonry and rock drill comprising first and second planar lateral side surfaces, first and second flank end surfaces, and first and second tip face surfaces. The first flank end surface is disposed at an acute included angle to the first lateral side surface defining a first flank cutting edge at the intersection of the first flank end surface and first lateral side surface. The second flank end surface is disposed at an acute included angle to the second lateral side surface defining a second flank cutting edge at the intersection of the second flank end surface and second lateral side surface. The first and second tip face surfaces converge from the first and second flank end surfaces, respectfully, to the center of the drill bit blade. The first tip face surface is disposed at an acute included angle to the first lateral side surface defining a first lateral cutting edge at the intersection of the first tip face surface and the first lateral side surface, and the first tip face surface is disposed at an obtuse included angle to the second lateral side surface defining a first trailing lateral edge at the intersection of the first tip face surface and the second lateral side surface parallel to the first lateral cutting edge. The second tip face surface is disposed at an acute included angle to the second lateral side surface defining a second lateral cutting edge at the intersection of the second tip face surface and the second lateral side surface, and the second tip face surface is disposed at an obtuse included angle to the first lateral side surface defining a second trailing lateral edge at the intersection of the second tip face surface and the first lateral side surface parallel to the second lateral cutting edge. The intersection of the first and second tip face surfaces define a chisel edge extending diagonally across the drill bit blade from the first lateral cutting edge to the second lateral cutting edge. A first notch is formed in the first lateral trailing edge and the second lateral cutting edge at one end of the chisel edge, and a second notch is formed in the second lateral trailing edge and the first lateral cutting edge at the other end of the chisel edge.

The provision of the first and second notches at opposite ends of the chisel edge accomplish a foreshortening of the chisel edge, provide a point at the apex, in profile, of the drill bit blade, and creates additional cutting edges.

In another advantageous embodiment, the present invention provides a drill bit blade for a masonry and rock drill comprising first and second planar lateral side surfaces, first and second flank end surfaces, and first and second tip face surfaces. The first flank end surface is disposed at an acute included angle to the first lateral side surface defining a first flank cutting edge at the intersection of the first flank end surface and the first lateral side surface. The second flank end surface is disposed at an acute included angle to the second lateral side surface defining a second flank cutting edge at the intersection of the second flank end surface and second lateral side surface. The first and second face surfaces converge from the first and second flank end surfaces, respectively, to the center of the drill bit blade. The first tip face surface is disposed at an acute included angle to the first lateral side surface defining a first lateral cutting edge at the intersection of the first tip face surface and the first lateral side surface, and the first tip face surface is disposed at an obtuse included angle to the second lateral side surface defining a first trailing lateral edge at the intersection of the first tip face surface and the second lateral side surface parallel to the first lateral cutting edge. The second tip face surface is disposed at an acute included angle to the second lateral side surface defining a second lateral cutting edge at the intersection of the second tip face surface and the second lateral side surface, and the second tip face surface is disposed at an obtuse included angle to the first lateral side surface defining a second trailing lateral edge at the intersection of the second tip face surface and the first lateral side surface parallel to the second lateral cutting edge. The intersection of the first and second tip face surfaces define a chisel edge extending diagonally across the drill bit blade from the first lateral cutting edge to the second lateral cutting edge. At least one third notch is formed in the first lateral cutting edge between the chisel edge and the intersection of the first lateral cutting edge with the first flank end surface dividing the first lateral cutting edge into a plurality of cutting edge segments.

BRIEF DESCRIPTION OF THE DRAWINGS

A better understanding of the present invention will be had upon reference to the following description in conjunction with the accompanying drawings in which like numerals refer to like parts throughout the several views and wherein:

FIG. 11 is a view of one side of yet another embodiment of a drill bit blade of the present invention;

FIG. 12 is a view of the other side of the drill bit blade of FIG. 11;

FIG. 13 is a top view of the drill bit blade of FIG. 11;

FIG. 14 is a view of one end of the drill bit blade of FIG. 6;

FIG. 15 is a view of the other end of the drill bit blade of FIG. 11;

FIG. 21 is a view of one side of still another embodiment of a drill bit blade of the present invention;

FIG. 22 is a view of the other side of the drill bit blade of FIG. 21;

FIG. 23 is a top view of the drill bit blade of FIG. 21;

FIG. 24 is a view of one end of the drill bit blade of FIG. 21;

FIG. 25 is a view of the other end of the drill bit blade of FIG. 21;

FIG. 36 is a view of one side of yet another embodiment of a drill bit blade of the present invention;

FIG. 37 is a view of the other side of the drill bit blade of FIG. 36;

FIG. 38 is a top view of the drill bit blade of FIG. 36;

FIG. 39 is a view of one end of the drill bit blade of FIG. 36;

FIG. 40 is a view of the other end of the drill bit blade of FIG. 36;

DETAILED DESCRIPTION OF THE PREFERRED EMBODIMENTS

Figure 1:
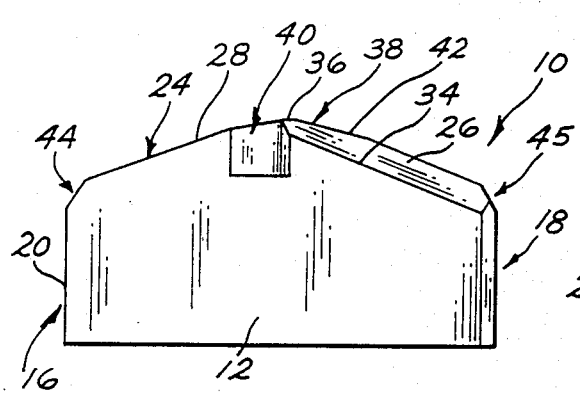
FIG. 1 is a view of one side of one embodiment of a drill bit blade of the present invention.
Figure 2:
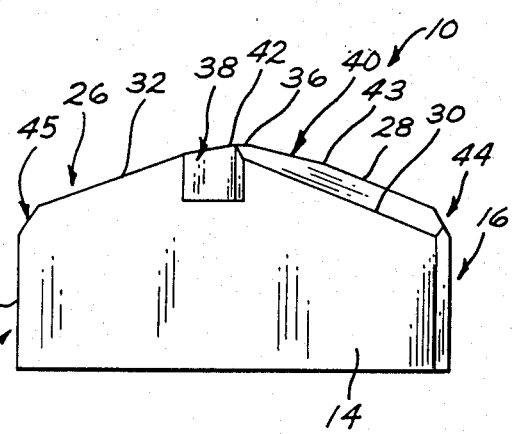
FIG. 2 is a view of the other side of the drill bit blade of FIG. 1.
Figure 3:
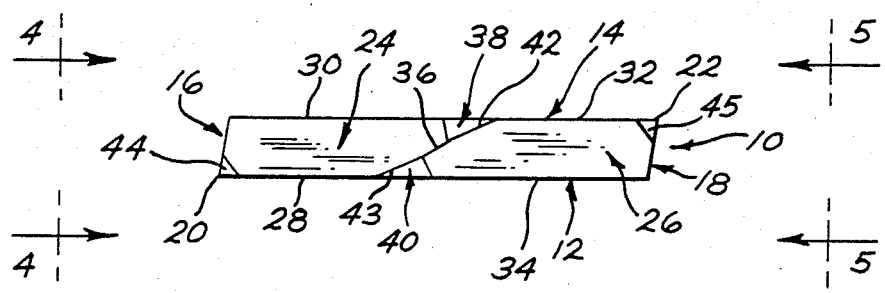
FIG. 3 is a top view of the drill bit blade of FIG. 1.
Figure 4:
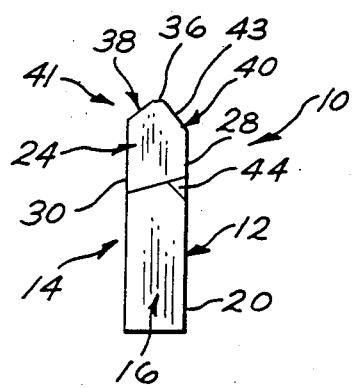
FIG. 4 is a view of one end of the drill bit blade of FIG. 1.
Figure 5:
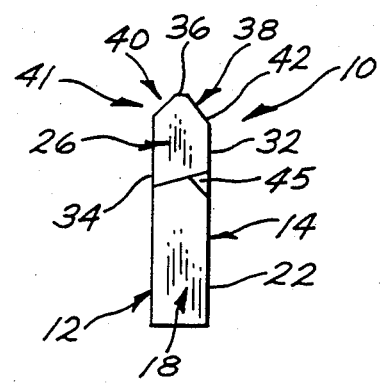
FIG. 5 is a view of the other end of the drill bit blade of FIG. 1.
Figure 6:
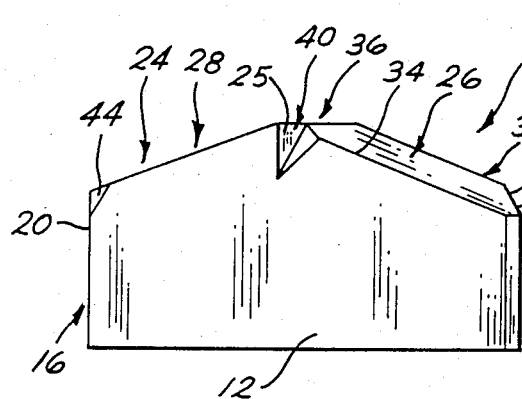
FIG. 6 is a view of one side of another embodiment of a drill bit blade of the present invention.
Figure 7:
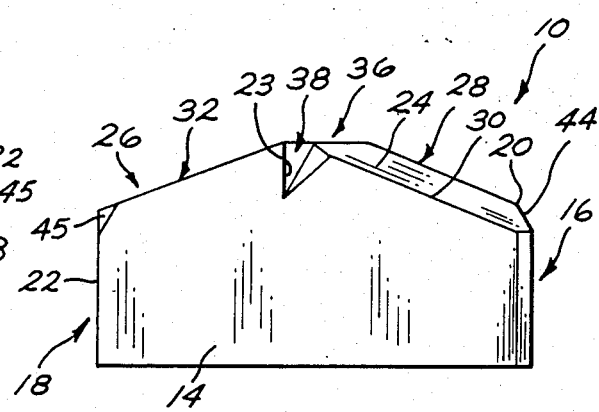
FIG. 7 is a view of the other side of the drill bit blade of FIG. 6.
Figure 8:
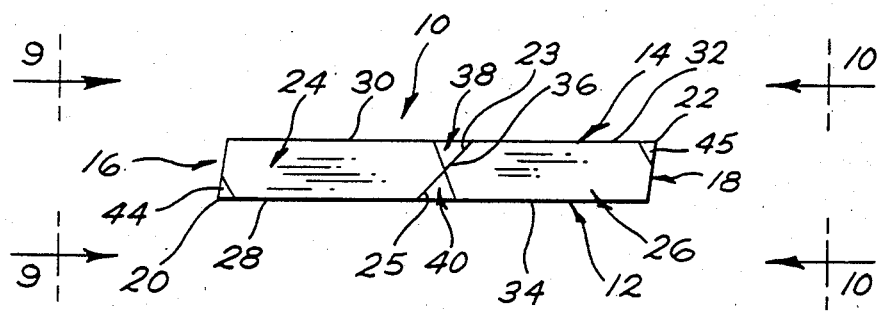
FIG. 8 is a top view of the drill bit blade of FIG. 6.
Figure 9:
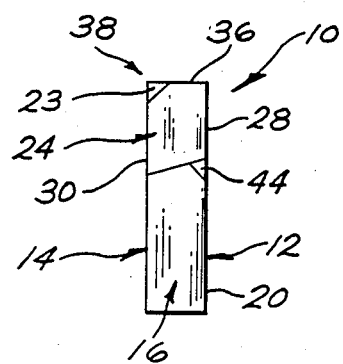
FIG. 9 is a view of one end of the drill bit blade of FIG. 6.
Figure 10:
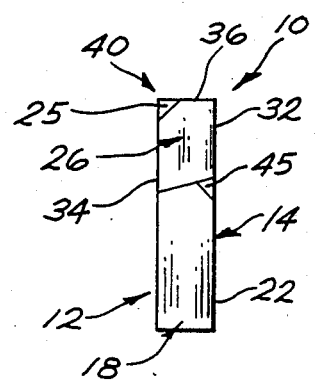
FIG. 10 is a view of the other end of the drill bit blade of FIG. 6.
Figure 16:
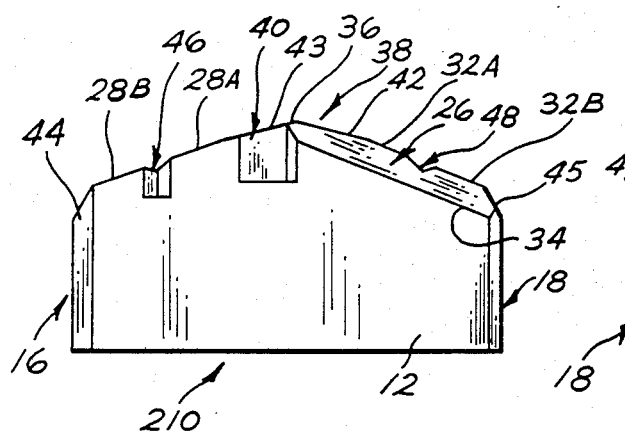
FIG. 16 is a view of one side of yet another embodiment of a drill bit blade of the present invention.

With reference to FIGS. 1-5, there is shown a drill bit blade, generally denoted as the numeral 10, of the present invention. The drill bit blade 10 is advantageously fabricated of carbide. The drill bit blade 10 includes a first planar lateral side surface 12, a second planar lateral side surface 14 parallel to the first lateral side surface 12, a first flank end surface 16, and a second flank end surface 18 parallel to the first flank end surface 16. The first flank end surface 16 is disposed at an acute included angle to the first lateral side surfaced 12 and cooperates with the first lateral side surface 12 to define a first flank cutting edge 20 at the intersection of the first flank end surface 16 and first lateral side surface 12. The second flank end surface 18 is disposed at an acute included angle to the second lateral side surface 14 and cooperates with the second lateral side surface 14 to define a second flank cutting edge 22 at the intersection of the second flank end surface 18 and the second lateral side surface 14. The drill bit blade 10 also includes a first tip face surface 24 and a second tip face surface 26. The first tip face surface 24 and second tip face surface 26 converge from the first flank end surface 16 and second flank end surface 18, respectively, to the center of the drill bit blade 10. The first tip face surface 24 is disposed at an acute included angle to the first lateral side surface 12 and cooperates with the first lateral side surface 12 to define a first lateral cutting edge 28 at the intersection of the first tip face surface 24 and first lateral side surface 12. The first tip face surface 24 is also disposed at an obtuse included angle to the second lateral side surface 14 and cooperates with the second lateral side surface 14 to define a first trailing lateral edge 30 at the intersection of the first tip face surface 24 and second lateral side surface 14. The first lateral cutting edge 28 and first lateral trailing edge 30 are parallel. The second tip face surface 26 is disposed at an acute included angle to the second lateral side surface 14 and cooperates with the second lateral side surface 14 to define a second lateral cutting edge 32 at the intersection of the second tip face surface 26 and second lateral side surface 14. The second tip face surface 26 is also disposed at an obtuse included angle to the first lateral side surface 12 and cooperates with the first lateral side surface 12 to define a second trailing lateral edge 34 at the intersection of the second tip face surface 26 and first lateral side surface 12. The second lateral cutting edge 32 is parallel to the second lateral trailing edge 34. The intersection of the converging first tip face surface 24 and second tip face surface 26 defines a chisel edge 36 which extends diagonally across tip face surfaces of the drill bit blade from the first lateral cutting edge 28 to the second lateral cutting edge 32.

A first V-shaped notch 38 is formed in both the first lateral trailing edge 30 and the second lateral cutting edge 32 at the intersection thereof at one end of the chisel edge 36 straddling the chisel edge 36. As can be best seen in FIGS. 3 and 5, the first notch 38 projects into both the first tip face surface 24 and the second tip face surface 26 such that one straight edge of the first V-shaped notch 38 is formed in the first tip face surface 24 and the other straight edge of the first V-shaped notch 38 is formed in the second tip face surface 26. Similarly, a second V-shaped notch 40 is formed in the second lateral trailing edge 34 and the first lateral cutting edge 28 at the intersection thereof at the other end of the chisel edge 36 straddling the chisel edge 36. As can be best seen in FIGS. 3 and 4, the second notch 40 projects into both the first tip face surface 24 and the second tip face surface 26 such that one straight edge of the second V-shaped notch 40 is formed in the second tip face surface 26 and the other straight edge of the second V-shaped notch 40 is formed in the first tip face surface 24. The first notch 38 extends into and downwardly along the second lateral side surface 14 a distance from the chisel edge, and the second notch 40 extends into and downwardly along the first lateral side surface 12 a distance from the chisel edge 36.

The first notch 38 and second notch 40 cooperate to foreshorten the length of the chisel edge 36. In addition, the first notch 38 and second notch 40 also provide for a pointed apex 41, in profile of the drill bit blade 10, at the intersection of the first tip face surface 24 with the second tip face surface 26. Furthermore, the edge 42 of the first notch 38 at the second tip face 26 defines an additional cutting edge to the second lateral cutting edge 32, and the edge 43 of the second notch 40 at the first tip face surface 24 defines an additional cutting edge to the first lateral cutting edge 28.

The drill bit blade 10 further includes a first chamfer 44 formed at the intersection of the first flank cutting edge 20 and the first lateral cutting edge 28, and a like second chamfer 45 formed at the intersection of the second flank cutting edge 22 and the second lateral cutting edge 32. The blunt corners formed by the chamfers 44 and 45 function to reduce the chances of the drill bit blade 10 breaking or fracturing at the location of the intersection of the flank cutting edges and lateral cutting edges and reduce the incidence particles breaking away.

Now referring to FIGS. 6 through 10, there is shown a drill bit blade also denoted generally as the numeral 10 which is identical in virtually every respect to the drill bit blade 10 of FIGS. 1 through 5 except for the disposition of the first notch 38 and second notch 40 relative to the chisel edge 36. As can be best seen in FIG. 8, the first notch 38 is formed in the first lateral trailing edge 30 immediately adjacent the chisel edge 36 with one straight edge of the first notch 38 formed in the first tip face surface 24 and the other straight edge of the first notch 38 coincidental with the chisel edge 36. Similarly the second notch 40 is formed in the second lateral trailing edge 34 immediately adjacent the chisel edge 36 with one straight edge of the second notch 40 formed in the second tip face surface 26 and the other straight edge of the second notch 40 coincidental with the chisel edge 36. Most advantageously, one side edge of the first notch 38 in the first lateral trailing edge 30 is coincident with the chisel edge 36, and one side edge of the second notch 40 in the second lateral trailing edge 34 is coincident with the chisel edge 36. As can be best seen in FIGS. 9 and 10, the provision of the first notch 38 and second notch 40 expose a major length of the chisel edge 36 which allows the chisel edge 36 to function as a cutting edge. Thusly, the portion of the chisel edge 36 exposed by the first notch 38 effectively increases the length of the second lateral cutting edge 32, and the second notch 40 effectively increases the length of the first lateral cutting edge 28. In addition, as can be best seen in FIG. 9, the length of the chisel edge 36 exposed by the first notch 38 cooperates with the second lateral side surface 14 to define a first sharp cutting point 23 at the intersection thereof, and as can be best seen in FIG. 10 the length of the chisel edge 36 exposed by the second notch 40 cooperates with the first lateral side surface 12 to define a second sharp cutting point 25 at the intersection thereof.

Now with reference to FIGS. 11 through 15, there is shown a drill bit blade, generally denoted as the numeral 110, of the present invention. The drill bit blade 110 includes features in common with the drill bit blade 10 of FIGS. 1-5, and these common features are denoted by the same numerals as in FIGS. 1-5. Therefore, for the sake of brevity and clarity of understanding, the description of the features common between the drill bit blade 110 and drill bit blade 10 will not be repeated. The drill bit blade 110 further includes a third notch 46 formed in either the first lateral cutting edge 28 or the second lateral cutting edge 32. As shown, the third notch 46 is formed in the first lateral cutting edge 28 between the chisel edge 36 and the intersection of the first lateral cutting edge 38 and the first flank cutting edge 20 dividing the first lateral cutting edge 28 into cutting edge segments 28A and 28B. As can be best seen in FIGS. 13-15, the third notch 46 projects into the first tip face surface 24. Also, as can be seen in FIG. 11, the third notch 46 also extends into and downwardly along the first lateral side surface 12 a distance from the first lateral cutting edge 28. As shown, the chamfers 44 and 45 are bevels extending part way along the first flank cutting edge 20 and second flank cutting edge 22, respectively.

Figure 17:
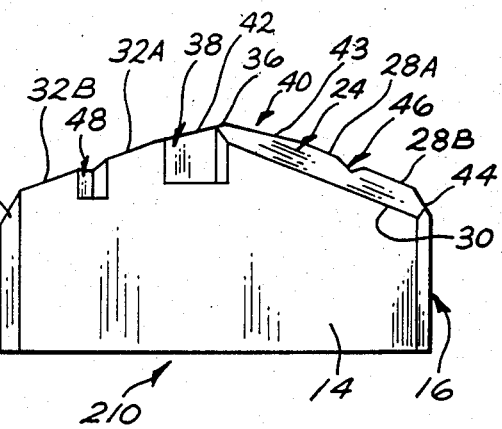
FIG. 17 is a view of the other side of the drill bit blade of FIG. 16.
Figure 18:
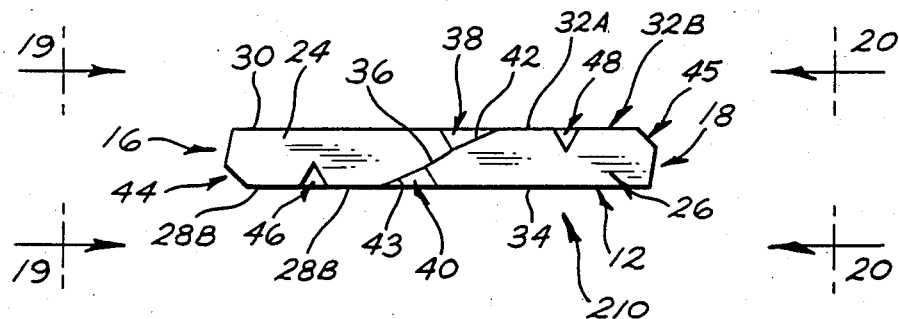
FIG. 18 is a top view of the drill bit blade of FIG. 16.
Figure 19:
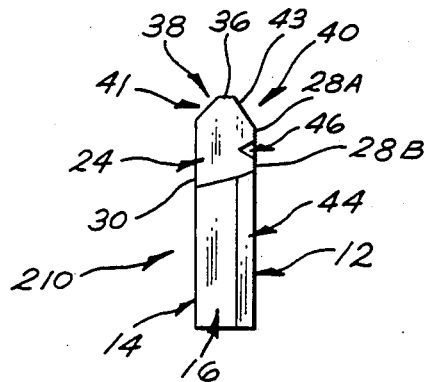
FIG. 19 is a view of one end of the drill bit blade of FIG. 16.
Figure 20:
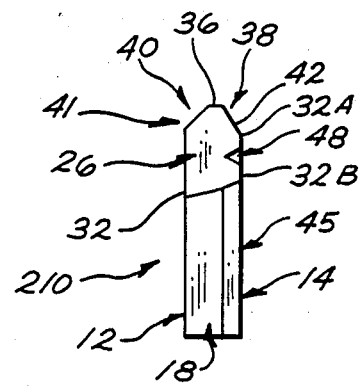
FIG. 20 is a view of the other end of the drill bit blade of FIG. 16.
Figure 26:
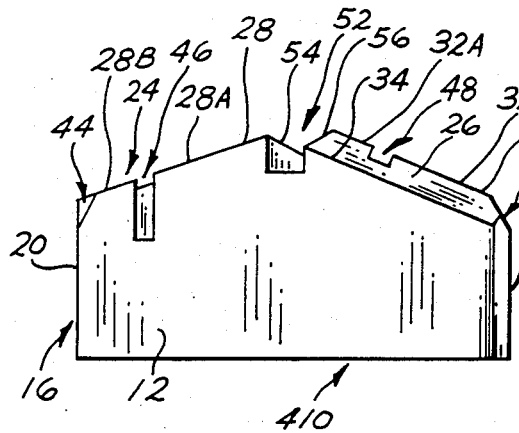
FIG. 26 is a view of one side of still yet another embodiment of a drill bit blade of the present invention.
Figure 27:
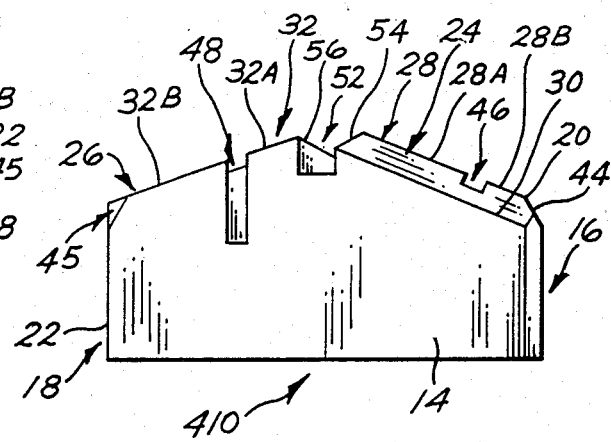
FIG. 27 is a view of the other side of the drill bit blade of FIG. 26.
Figure 28:
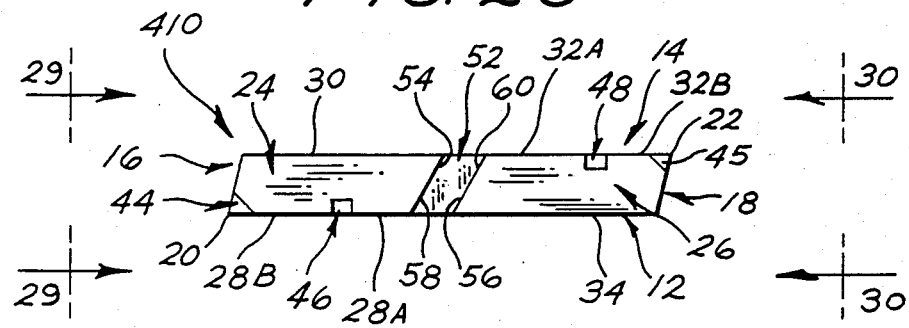
FIG. 28 is a top view of the drill bit blade of FIG. 26.
Figure 29:
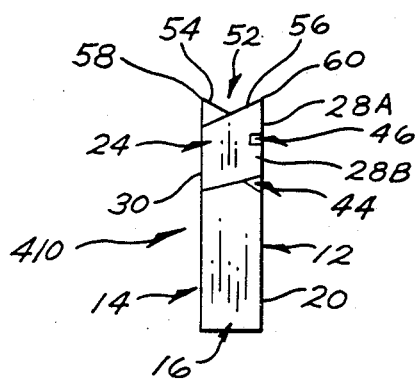
FIG. 29 is a view of one end of the drill bit blade of FIG. 26.
Figure 30:
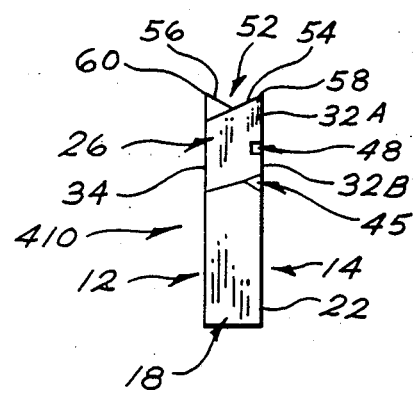
FIG. 30 is a view of the other end of the drill bit blade of FIG. 26.

Referring now to FIGS. 16 through 20, there is shown a drill bit blade, generally denoted as the numeral 210, of the present invention. The drill bit blade 210 includes features in common with the drill bit blade 10 of FIGS. 1-5 and the drill bit blade 110 of FIGS. 11-15, and these common features are denoted by the same numerals as in FIGS. 1-5 and 11-15. Therefore, for the sake of brevity and clarity of understanding, the description of the features common between the drill bit blade 210 and drill bit blades 10 and 110 will not be repeated. The drill bit blade 210 further includes a fourth notch 48 formed in the second lateral cutting edge 32 between the chisel edge 36 and the intersection of the second lateral cutting edge 32 and the second flank cutting edge 22 dividing the second lateral cutting edge 32 into cutting edge segments 32A and 32B. The fourth notch 48 extends into the second lateral side surface 14 a distance from the second lateral cutting edge 32. As can be best seen in FIGS. 18-20, the fourth notch 48 projects into the second tip face surface 26. Also, as can be seen in FIG. 17, the fourth notch 48 also extends into and downwardly along the second lateral side surface 14 a distance from the second lateral cutting edge 32. It should be noted, as can be best seen in FIG. 18, that the distance between the chisel edge 36 and the third notch 46 in the first lateral cutting edge 28 measured laterally or along the first lateral cutting edge 28 is different than the distance between the chisel edge 36 and the fourth notch 48 in the second lateral cutting edge 32 measured laterally or along the second lateral cutting edge 32. The third notch 46 and fourth notch 48 are offset from each other, that is they are asymmetrically located. As shown, the distance between the second notch 40 and third notch 46 in the first lateral cutting edge 28 is larger than the distance between the first notch 38 and fourth notch 48 in the second lateral cutting edge 32. As shown, the chamfers 44 and 45 are bevels extending along the entire length of the first flank cutting edge 20 and second flank cutting edge 22, respectively, thus blunting these flank cutting edges entirely.

With reference to FIGS. 21 through 25, there is shown a drill bit blade, generally denoted as the numeral 310, of the present invention. The drill bit blade 310 includes features in common with the drill bit blade 210 of FIGS. 16–20 as well as the drill bit blades 10 and 110. These common features are denoted by the same numerals as in FIGS. 16–20 as well as FIGS. 1–5 and 11–15. Therefore, for the sake of brevity and clarity of understanding, the description of the features common between the drill bit blade 310 and drill bit blades 10, 110, 210 will not be repeated. The drill bit blade 310 further includes a fifth notch 50 formed in the first lateral cutting edge 28 spaced from the third notch 46 in the first lateral cutting edge 28 laterally or along the first lateral cutting edge 28. The third notch 46 and fifth notch 50 cooperate to divide the first lateral cutting edge 28 into three cutting edge segments 28A, 28B and 28C. As can be best seen in FIGS. 23–25, the fifth notch 50 projects into the first tip face surface 24. Also, as can be seen in FIG. 21, the fifth notch 50 also extends into and downwardly along the first lateral side face 12 a distance from the first lateral cutting edge 28. The third notch 46 and fifth notch 50 are asymetrically located to the fourth notch 48 relative to the chisel edge 36 longitudinally of the lateral cutting edge 28 and the lateral cutting edge 32, respectively in which they are formed. Also, the space between the third notch 46 and the fifth notch 50 measured along the first lateral cutting edge 28 is greater than the space between the fourth notch 48 and the chisel edge 36 measured along the second lateral cutting edge 32. In addition, preferably, the summation of the lengths of the cutting edge segments 28A, 28B, 28C of the first lateral cutting edge 28 and the lengths of the cutting edge segments 32A, 32B of the second lateral cutting edge 32 is substantially equal to the entire length of either one of the first and second lateral cutting edges 28 and 30, respectively.

Figure 31:
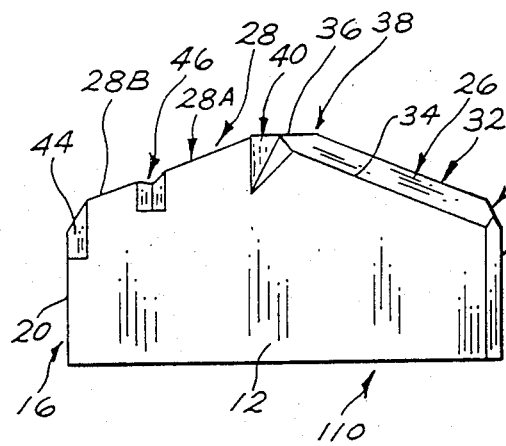
FIG. 31 is a view of one side of yet another embodiment of a drill bit blade of the present invention.
Figure 32:
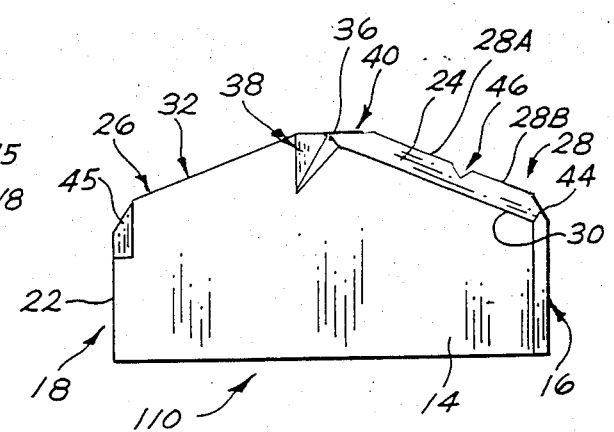
FIG. 32 is a view of the other side of the drill bit blade of FIG. 31.
Figure 33:
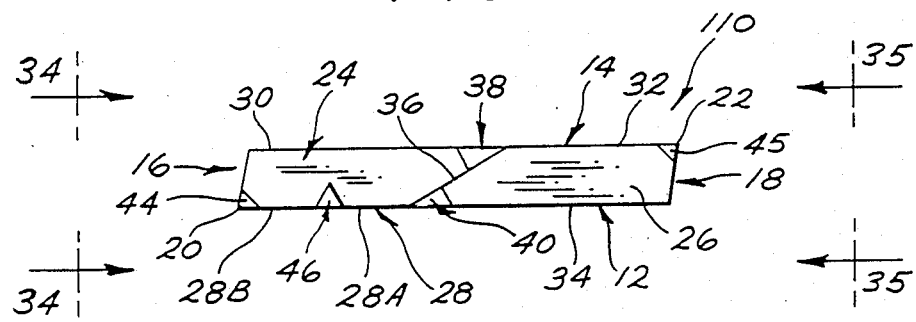
FIG. 33 is a top view of the drill bit blade of FIG. 31.
Figure 34:
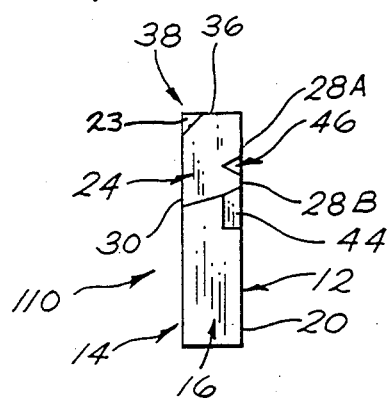
FIG. 34 is a view of one end of the drill bit blade of FIG. 31.
Figure 35:
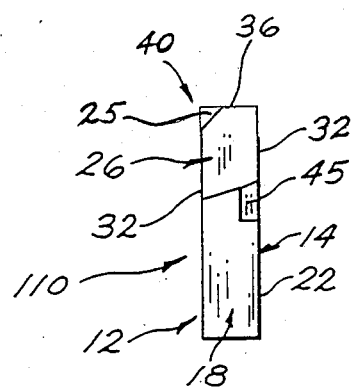
FIG. 35 is a view of the other end of the drill bit blade of FIG. 31.

Now with reference to FIGS. 31 through 35, there is shown a drill bit blade, generally denoted as the numeral 110, of the present invention. The drill bit blade 110 includes features in common with the drill bit blade 10 of FIGS. 6–10, and these common features are denoted by the same numerals as in FIGS. 6–10. Therefore, for the sake of brevity and clarity of understanding, the description of the features common between the drill bit blade 110 and drill bit blade 10 of FIGS. 6–10 will not be repeated. The drill bit blade 110 further includes a third notch 46 formed in either the first lateral cutting edge 28 or the second lateral cutting edge 32. As shown, the third notch 46 is formed in the first lateral cutting edge 28 between the chisel edge 36 and the intersection of the first lateral cutting edge 38 and the first flank cutting edge 20 dividing the first lateral cutting edge 28 into cutting edge segments 28A and 28B. As can be best seen in FIGS. 33–35, the third notch 46 projects into the first tip face surface 24. Also, as can be seen in FIG. 31, the third notch 46 also extends into and downwardly along the first lateral side surface 12 a distance from the first lateral cutting edge 28. As shown, the chamfers 44 and 45 are bevels extending part way along the first flank cutting edge 20 and second flank cutting edge 22, respectively.

Referring now to FIGS. 36 through 40, there is shown a drill bit blade, generally denoted as the numeral 210, of the present invention. The drill bit blade 210 includes features in common with the drill bit blade 10 of FIGS. 6–10 and the drill bit blade 110 of FIGS. 31–35, and these common features are denoted by the same numerals as in FIGS. 6–10 and 31–35. Therefore, for the sake of brevity and clarity of understanding, the description of the features common between the drill bit blade 210 and drill bit blades 10 of FIGS. 6–10 and 110 of FIGS. 31–35 will not be repeated. The drill bit blade 210 further includes a fourth notch 48 formed in the second lateral cutting edge 32 between the chisel edge 36 and the intersection of the second lateral cutting edge 32 and the second flank cutting edge 22 dividing the second lateral cutting edge 32 into cutting edge segments 32A and 32B. The fourth notch 48 extends into the second lateral side surface 14 a distance from the second lateral cutting edge 32. As can be best seen in FIGS. 38–40, the fourth notch 48 projects into the second tip face surface 26. Also, as can be seen in FIG. 37, the fourth notch 48 also extends into and downwardly along the second lateral side surface 14 a distance from the second lateral cutting edge 32. It should be noted, as can be best seen in FIG. 38, that the distance between the chisel edge 36 and the third notch 46 in the first lateral cutting edge 28 measured laterally or along the first lateral cutting edge 28 is different than the distance between the chisel edge 36 and the fourth notch 48 in the second lateral cutting edge 32 measured laterally or along the second lateral cutting edge 32. The third notch 46 and fourth notch 48 are offset from each other, that is they are asymmetrically located. As shown, the distance between the second notch 40 and the third notch 46 in the first lateral cutting edge 28 is larger than the distance between the first notch 38 and fourth notch 48 in the second lateral cutting edge 32. As shown, the chamfers 44 and 45 are bevels extending along the entire length of the first flank cutting edge 20 and second flank cutting edge 22, respectively, thus blunting these flank cutting edges entirely.

Figure 41:
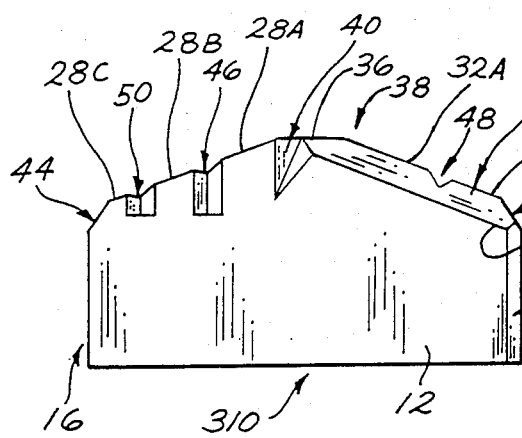
FIG. 41 is a view of one side of still another embodiment of a drill bit blade of the present invention.
Figure 42:
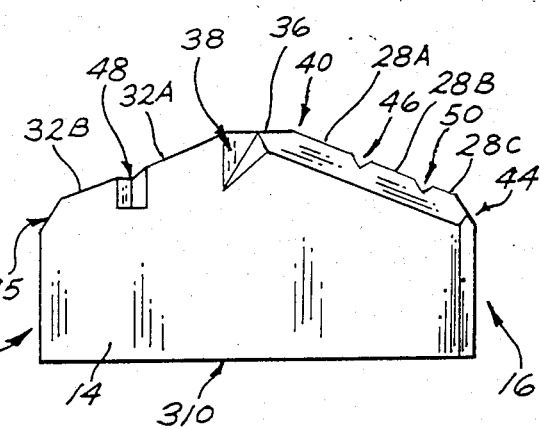
FIG. 42 is a view of the other side of the drill bit blade of FIG. 41.
Figure 43:
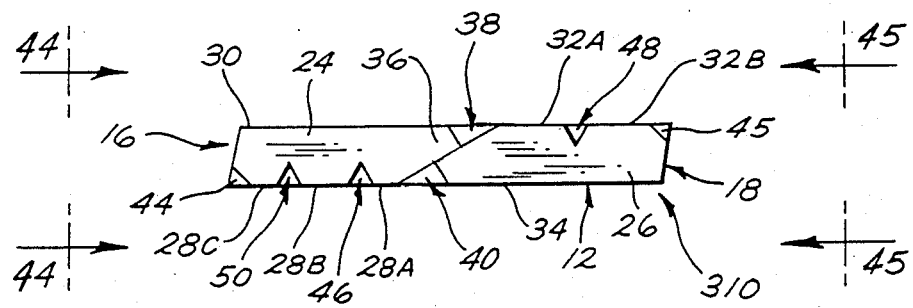
FIG. 43 is a top view of the drill bit blade of FIG. 41.
Figure 44:
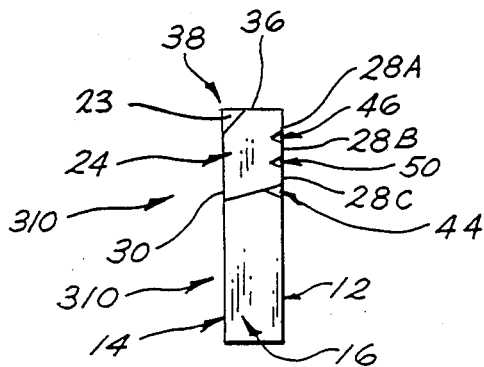
FIG. 44 is a view of one end of the drill bit blade of FIG. 41.
Figure 45:
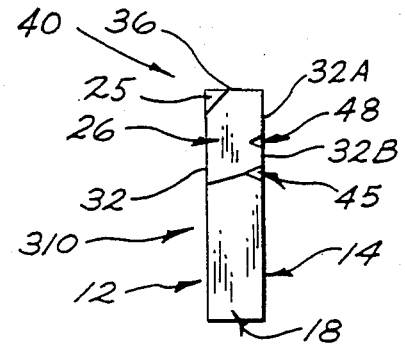

With reference to FIGS. 41 through 45, there is shown a drill bit blade, generally denoted as the numeral 310, of the present invention. The drill bit blade 310 includes features in common with the drill bit blade 210 of FIGS. 36–40 as well as the drill bit blades 20 of FIGS. 6–10 and 100 of FIGS. 31–35. These common features are denoted by the same numerals as in FIGS. 36–40 as well as FIGS. 6–10 and 31–35. Therefore, for the sake of brevity and clarity of understanding, the description of the features common between the drill bit blade 310 and drill bit blades 10, 110, 210 will not be repeated. The drill bit blade 310 further includes a fifth notch 50 formed in the first lateral cutting edge 28 spaced from the third notch 46 in the first lateral cutting edge 28 laterally or along the first lateral cutting edge 28. The third notch 46 and fifth notch 50 cooperate to divide the first lateral cutting edge 28 into three cutting edge segments 28A, 28B and 28C. As can be best seen in FIGS. 24-25, the fifth notch 50 projects into the first tip face surface 24. Also, as can be seen in FIG. 41, the fifth notch 50 also extends into and downwardly along the first lateral side face 12 a distance from the first lateral cutting edge 28. In addition, preferably, the summation of the lengths of the cutting edge segments 28A, 28B, 28C of the first lateral cutting edge 28 and the lengths of the cutting edge segments 32A, 32B of the second lateral cutting edge 32 is substantially equal to the entire length of either one of the first and second lateral cutting edges 28 and 30, respectively.

With reference to FIGS. 26 through 30, there is shown a drill bit blade 410 of the present invention which includes features in common with the drill bit blade 210 of FIGS. 16 through 20 and, these common features are denoted by the numerals as in FIGS. 16 through 20. Therefore, for the sake of brevity and clarity of understanding, the description of the features common between the drill bit 410 and the drill bit 210 will not be repeated. The somewhat different feature of the drill bit 410 is that the first notch 38 and second notch 40 have been replaced by a single transverse notch 52 which extends across the tip face of the drill bit 410 at the location of the chisel edge 36. As shown in FIGS. 26 through 30, the notch 52 extends across the drill bit tip face from the first lateral side surface 12 to the second lateral side surface 14 at the center of the drill bit between the first tip face surface 24 and second tip face surface 26. In other words, the drill bit blade 410 does not have a single chisel edge 36, but the transverse notch 52 is formed in the drill bit blade 410 at the intersection of the first tip face surface 24 and second tip face surface 26 which would otherwise define the chisel edge 36 of the drill bit blade 210 of FIGS. 16 through 20. Preferably, the transverse notch 52 extends diagonally across the tip faces 24 and 26 at about the same angle as would the chisel edge 36. The transverse notch 52 cooperates with the first tip face surface 24 to define a first transverse edge 54 and cooperates with the second tip face surface 26 to define a second transverse edge 56. In addition, the first transverse edge 54 cooperates with the first lateral side surface 12 to define a first sharp cutting point, 58 at the intersection thereof as can be best seen in FIG. 29, and the second transverse edge 56 cooperates with the second lateral side surface 14 to define a second sharp cutting point 60 at the intersection thereof as can be best seen in FIG. 30.

The foregoing detailed description is given primarily for clearness of understanding and no unnecessary limitations are to be understood therefrom for modifications will become obvious to those skilled in the art upon reading this disclosure and may be made without departing from the spirit of the invention or scope of the appended claims.

We claim:

1. A drill bit blade for a masonry and rock drill comprising:

first and second planar lateral side surfaces;
first and second flank end surfaces;
first and second tip face surfaces converging from the first and second flank end surfaces, respectively, to the center of the drill bit blade, the first tip face surface being disposed at an acute included angle to the first lateral side surface defining a first lateral cutting edge at the intersection of the first tip face surface and the first lateral side surface, and the first tip face surface being disposed at an obtuse included angle to the second lateral side surface defining a first trailing lateral edge at the intersection of the first tip face surface and the second lateral side surface parallel to the first lateral cutting edge, the second tip face surface being disposed at an acute included angle to the second lateral side surface defining a second lateral cutting edge at the intersection of the second tip face surface and the second lateral side surface, and the second tip face surface being disposed at an obtuse included angle to the first lateral side surface defining a second trailing lateral edge at the intersection of the second tip face surface and the first lateral side surface parallel to the second lateral cutting edge, and the intersection of the first and second tip face surfaces defining a chisel edge extending diagonally across the drill bit blade from the first lateral cutting edge to the second lateral cutting edge;

a first V-shaped notch formed in the first lateral trailing edge immediately adjacent the chisel cutting edge such that one straight edge of the first notch is formed in the first tip face surface and the other straight edge of the first notch is coincidental with the chisel cutting edge; and a second V-shaped notch formed in the second lateral trailing edge immediately adjacent the chisel cutting edge such that one straight edge of the second notch is formed in the second tip face and the other straight edge of the second notch is coincidental with the chisel cutting edge.

2. A drill bit blade for a masonry and rock drill, comprising:

first and second planar lateral side surfaces;
first and second flank end surfaces;
first and second tip face surfaces converging from the first and second flank end surfaces, respectively, to the center of the drill bit blade, the first tip face surface being disposed at an acute included angle to the first lateral side surface defining a first lateral cutting edge at the intersection of the first tip face surface and the first lateral side surface, and the first tip face surface being disposed at an obtuse included angle to the second lateral side surface defining a first trailing lateral edge at the intersection of the first tip face surface and the second lateral side surface and the second lateral side surface parallel to the first lateral cutting edge, the second tip face surface being disposed at an acute included angle to the second lateral side surface defining a second lateral cutting edge at the intersection of the second tip face surface and the second lateral side surface, and the second tip face surface being disposed at an obtuse included angle to the first lateral side surface defining a trailing lateral edge at the intersection of the second tip face surface and the first lateral side surface parallel to the second lateral cutting edge, and the intersection of the first and second tip face surfaces defining a chisel edge extending diagonally across the drill bit blade from the first lateral cutting edge to the second lateral cutting edge;

a first notch formed in the first lateral trailing edge immediately adjacent the chisel cutting edge;

a second notch formed in the second lateral trailing edge immediately adjacent the chisel cutting edge; and, a third notch formed in the first lateral cutting edge between the chisel edge and the intersection of the first lateral cutting edge and first flank end surface dividing the first lateral cutting edge into segments.

3. The drill bit blade of claim 2, further comprising a fourth notch formed in the second lateral cutting edge between the chisel edge and the intersection of the second lateral cutting edge and second flank end surface dividing the second lateral cutting edge into segments.

4. The drill bit blade of claim 3, wherein the third notch and the fourth notch are asymetrically located relative to the chisel edge longitudinally of the lateral cutting edges in which they are formed.

5. The drill bit blade of claim 4, further comprising a fifth notch formed in the first lateral cutting edge spaced from the second notch in the first lateral cutting edge longitudinally of the first lateral cutting edge further dividing the first lateral cutting edge into segments.

6. The drill bit blade of claim 5, wherein both the third and fifth notches are asymetrically located to the fourth notch relative to the chisel edge longitudinally of the lateral cutting edges in which they are formed.

7. The drill bit blade of claim 5, wherein the space between the third and fifth notches measured along the first lateral cutting edge is greater than the space between the fourth notch and chisel edge measured along the second lateral cutting edge.

8. The drill bit blade of claim 1, further comprising:

the first flank end surface being disposed at an acute included angle to the first lateral side surface defining a first flank cutting edge at the intersection thereof, and the second flank end surface being disposed at an acute included angle to the second lateral side surface defining a second flank cutting edge at the intersection thereof.

9. The drill bit blade of claim 8, further comprising a chamfer formed at the intersection of the first flank cutting edge and the first lateral cutting edge, and a chamfer formed at the intersection of the second flank cutting edge and the second lateral cutting edge.

10. A drill bit blade for a masonry and rock drill comprising:

first and second planar lateral side surfaces;

first and second flank end surfaces;

first and second tip face surfaces converging from the first and second flank end surfaces, respectively, to the center of the drill bit blade, the first tip face surface being disposed at an acute included angle to the first lateral side surface defining a first lateral cutting edge at the intersection of the first tip face surface and the first lateral side surface, and the first tip face surface being disposed at an obtuse included angle to the second lateral side surface defining a first trailing lateral edge at the intersection of the first tip face surface and the second lateral side surface parallel to the first lateral cutting edge, the second tip face surface being disposed at an acute included angle to the second lateral side surface defining a second lateral cutting edge at the intersection of the second tip face surface and the second lateral side surface, and the second tip face surface being disposed at an obtuse included angle to the first lateral side surface defining a second trailing lateral edge at the intersection of the second tip face surface and the first lateral side surface parallel to the second lateral cutting edge, and the intersection of the first and second tip face surfaces defining a chisel edge extending diagonally across the drill bit blade;

a first notch formed in both the first lateral trailing edge and second lateral cutting edge at the intersection thereof at one end of the chisel edge;

a second notch formed in both the second lateral trailing edge and first lateral cutting edge at the intersection thereof at the other end of the chisel edge; and a third notch formed in the first lateral cutting edge between the chisel edge and the intersection of the first lateral cutting edge and the first flank end surface dividing the first lateral cutting edge into segments.

11. The drill bit blade of claim 10, further comprising a fourth notch formed in the second lateral cutting edge between the chisel edge and the intersection of the second lateral cutting edge and second flank end surface dividing the second lateral cutting edge into segments.

12. The drill bit blade of claim 11, wherein the third notch and the fourth notch are asymetrically located relative to the chisel edge longitudinally of the lateral cutting edges in which they are formed.

13. The drill bit blade of claim 12, further comprising a fifth notch formed in the first lateral cutting edge spaced from the second notch in the first lateral cutting edge longitudinally of the first lateral cutting edge further dividing the first lateral cutting edge into segments.

14. The drill bit blade of claim 13, wherein both the third and fifth notches are asymetrically located to the fourth notch relative to the chisel edge longitudinally of the lateral cutting edges in which they are formed.

15. The drill bit blade of claim 13, wherein the space between the third and fifth notches measured along the first lateral cutting edge is greater than the space between the fourth notch and chisel edge measured along the second lateral cutting edge.

16. The drill bit blade of claim 10, further comprising:

the first flank end surface being disposed at an acute included angle to the first lateral side surface defining a first flank cutting edge at the intersection thereof, and the second flank end surface being disposed at an acute included angle to the second lateral side surface defining a second flank cutting edge at the intersection thereof.

17. The drill bit blade of claim 16, further comprising a chamfer formed at the intersection of the first flank cutting edge and the first lateral cutting edge, and a chamfer formed at the intersection of the second flank cutting edge and the second lateral cutting edge.

18. The drill bit blade of claim 10, wherein the first notch in the first lateral trailing edge straddles the chisel cutting edge on one end thereof, and the second notch in the second lateral trailing edge straddles the chisel cutting edge at the other end thereof.

* * * * *